Patented Jan. 12, 1932

1,841,258

UNITED STATES PATENT OFFICE

HUGH J. SCULLEN, OF DETROIT, MICHIGAN, ASSIGNOR TO COPELAND PRODUCTS INC., A CORPORATION OF MICHIGAN

LIQUID FOR USE WITH REFRIGERATION SYSTEMS

No Drawing. Application filed July 21, 1928. Serial No. 294,579.

In the construction of refrigerating systems, and more particularly of household refrigerating systems, it is quite the usual custom to employ around the evaporator or heat absorbing element what is commonly called a brine tank. This is a tank containing a solution which is adapted to be chilled by the action of the heat absorbing element so that the idle period of the system may be lengthened because the chilled solution acts very much in the same manner as a cake of ice placed in the ordinary refrigerator, serving to keep the same cold. Some systems do not employ a brine tank but the idle period of the same is invariably lessened by the absence of the brine so that the mechanism is started and stopped many more times during the day than would be the case if a brine solution were employed.

The term "brine" as herein used designates broadly any solution which will accomplish the desired purpose and is not to be considered as limited to a solution wherein salt is employed. The term "brine" is now generally employed in the refrigeration art to designate any solution which is used in conjunction with the heat absorbing portion of the system for the purpose of storing cold or lengthening the idle period of the system.

The primary object of my invention is to provide a solution of the class described which will have such properties that the idle period of the system may be materially increased and at the same time the amount of the solution which is used materially decreased.

As above stated the usual brine solution is not normally frozen by the refrigeration system but is merely chilled. I propose to employ a solution which may be frozen during the normal operation of the refrigeration system. All brine solutions with which I am familiar are such that when freezing temperatures are applied thereto the composition of the solution changes in that certain elements of the composition will start to freeze before others thereof will do so. The result of this is that freezing will occur over a very wide temperature range and final freezing will not occur until a temperature has been reached much lower than is commonly employed.

I preferably employ a solution which has a substantially constant freezing and melting temperature or one which will not vary in temperature more than five degrees Fahrenheit from the time freezing first begins to the time that the entire solution is frozen. A solution such as I have in mind might well be called an eutectic solution, by which is meant one wherein the character or composition of the solution does not substantially vary during the freezing period. In other words, the elements of the solution will freeze at substantially the same rate, in accordance with their proportions.

As above stated, the solution is preferably one whose freezing point is within the operating temperature range of the refrigeration system with which it is employed. By freezing point I mean the eutectic point of the solution or that temperature at which substantially the entire solution becomes frozen. The desirable characteristic for most refrigeration systems is a solution whose eutectic point is above zero degrees Fahrenheit and below thirty degrees Fahrenheit, and it is such a solution to which I have largely directed my attention.

There are comparatively few known eutectic solutions which would be suitable for the use desired. One solution which is admirably fitted for use with a conventional household refrigerating system is one composed of a combination of barium chloride and water. I have found that a composition substantially in proportions of 23.2% barium chloride and 76.8% water has an eutectic point of substantially 17.6° F. Furthermore this solution is in reality an eutectic solution because the temperature range for entirely freezing or melting thereof is substantially constant. Thus, when a solution of this character is employed, the controls for the refrigeration system may be so set as to start the heat dissipating mechanism when a temperature of say 19° has been reached and to stop operation thereof when a temperature 16° has been reached. During this short temperature change the solution will be alternately melted and frozen.

After it has been frozen the length of time that the surrounding atmosphere is maintained at a desirable temperature is materially increased over the corresponding time when a chilled brine solution is employed. Furthermore, a much smaller amount of solution may be employed as compared with the conventional brine solution. If a temperature lower or higher than this prescribed range is desired to be maintained, the solution may be altered to one which will have the desired eutectic point.

It will be obvious that various changes may be made in the particular solution which I have herein described without departing from the spirit of my invention and it is my intention to cover by my claims such changes as may be reasonably included within the scope of my invention.

What I claim is:

1. A brine for use as a heat absorption medium around the evaporator element of a refrigerator system comprising an eutectic solution of water and an inorganic salt, the brine being adapted to freeze in the normal operating range of the system.

2. A brine for use as a heat absorption medium around the evaporator element of a refrigerator, the brine comprising a solution of barium chloride and water having a freezing range not greater than five degrees F., the solution being adapted to solidify in the operating range of the refrigerator.

3. A brine for use as a heat absorption medium about the evaporator of a refrigerator comprising an eutectic mixture of barium chloride and water adapted to freeze in the normal operating range of the refrigerator.

4. A brine for use as a heat absorption medium about the evaporator of a refrigerator comprising an eutectic solution of an inorganic salt and water, the solution having a freezing point below 30 degrees F. and within the normal operating range of the system.

HUGH J. SCULLEN.